Patented Nov. 14, 1933

1,935,205

UNITED STATES PATENT OFFICE 1,935,205

MANUFACTURE OF NEW DYESTUFFS AND THE APPLICATION THEREOF

George Holland Ellis, Spondon, near Derby, England, assignor to Celanese Corporation of America, a corporation of Delaware No Drawing. Application December 1, 1928, Serial No. 323,211, and in Great Britain December 13, 1927

8 Claims. (Cl. 8—5)

This invention relates to the manufacture of new azo dyestuffs and to materials coloured therewith. They are more particularly valuable for the coloration of materials made of or containing cellulose acetate or other cellulose esters, for instance cellulose formate, propionate or butyrate or the products obtained by the treatment of alkalized cellulose with esterifying agents (e. g. the product known as "immunized cotton" obtained by treatment with p-toluene sulphochloride), or made of or containing cellulose ethers, for example methyl, ethyl or benzyl cellulose, or the corresponding condensation products of cellulose and glycols or other polyhydric alcohols.

The new azo dyestuffs of the present invention are characterized by the presence therein of the xanthene nucleus, i. e.

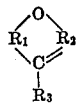

where $R_1$ and $R_2$ represent aryl residues and $R_3$ represents hydrogen, alkyl or aryl.

The new dyestuffs may be obtained by diazotizing xanthene derivatives containing one or more diazotizable amino groups and coupling with any suitable components. The monoazo dyestuffs thus prepared will have the general formula

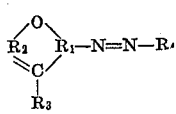

where $R_4$ represents an azo coupling component and, as before, $R_1$ and $R_2$ represent aryl residues, and $R_3$ hydrogen, alkyl or aryl.

Disazo and polyazo dyestuffs may further be obtained from the dyestuffs thus prepared either by diazotizing amino groups therein and coupling with suitable components or by coupling with diazo compounds.

The xanthene derivatives, in addition to containing diazotizable amino groups, may contain any other substituent groups, for example carboxyl, alkyl, halogen, substituted amino, hydroxy, alkoxy, carboxyester, mercapto and sulphonic.

The new azo dyestuffs may be formed on the fibre or material or made in substance. Those formed in substance may be applied to cotton, artificial fibres of the cellulosic type and other cellulose materials, particularly with the aid of a tannin mordant, while the acid dyestuffs produced according to the present invention may be applied to animal fibres such as wool and silk. The xanthene derivatives may alternatively be applied to the materials in the ordinary manner and the azo dyestuffs formed thereon as described above for the preparation of the dyestuffs.

The dyestuffs of the present invention, and more particularly the unsulphonated colours, are however especially of value for dyeing or otherwise colouring materials comprising cellulose acetate or other cellulose esters or comprising cellulose ethers, whether such dyestuffs be applied as such or formed on the fibre. For this purpose the dyestuffs formed by coupling diazotized unsulphonated amino-xanthene derivatives with suitable components for example p-xylidine, cresidines, anisidines, m-phenylenediamine, nitro-m-phenylenediamine, m-aminophenol, mono-acetyl-m-aminophenol, dimethyl-m-aminophenol, α-naphthylamine, β-naphthylamine and 1-amino-2-methoxy-naphthalene, are particularly useful.

The dyestuffs or components may be applied to the cellulose esters or ethers in the form of aqueous solutions of their salts, such as the hydrochlorides, or in the form of aqueous suspensions or dispersions produced by any suitable methods, or in any other convenient form. Dispersions of the dyestuffs or components may be obtained, for example, by grinding (for instance in the so-called colloid mills), by dissolving in a solvent and mixing the solution with water containing or not containing protective colloids, or they may be dispersed by means of dispersators, for example by the methods described in prior U. S. Patents Nos. 1,618,413 and 1,618,414, and U. S. applications S. Nos. 50,525 filed 15th August 1925, 48,666 filed 6th August 1925, 152,517 filed 3rd December 1926, 134,138 filed 7th September 1926 and 176,289 filed 17th March 1927.

Dyestuffs containing diazotizable amino groups may be diazotized on the fibre and developed, whilst those containing groups capable of effecting a coupling may similarly be developed on the fibre with the aid of solutions of diazo-bodies.

The most valuable dyestuffs obtainable according to the present invention are the green to blue colours prepared by diazotizing 2-methyl-3-amino-6-dimethylamino-9-ortho-ethyl-carboxy-phenyl-xanthenyl chloride

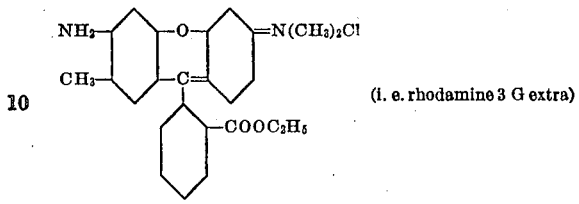

(i. e. rhodamine 3 G extra)

and coupling with suitable coupling components. For example with phenol a reddish-blue is obtained; with dimethylaniline a greenish-blue; and with m-toluidine a reddish-blue.

The following examples are illustrative of the preparaton of dyestuffs in substance and on the fibre and of dyeings obtainable therewith but they are not to be regarded as limiting the invention in any way:

Example 1

88.5 parts of 2-methyl-3-amino-6-dimethyl-amino-9-ortho-carboxy-phenyl-xanthenyl chloride (rhodamine 3 G extra; Colour Index No. 753) are dissolved in water containing 24 parts of hydrochloric acid (30%) and a solution containing 7.5 parts of sodium nitrite is added slowly with stirring. The solution is stirred for half an hour or until diazotization is complete and is then run slowly into a solution obtained by dissolving 21 parts of m-toluidine in water containing 29 parts of hydrochloric acid (30%), mineral acidity being neutralized by addition of the requisite quantity of sodium acetate solution (test with Congo paper). Coupling proceeds rapidly and the dyestuff is isolated in the usual manner.

Example 2

To obtain the dyestuff 2-methyl-6-dimethyl-amino-9-ortho-ethyl-carboxy-phenyl-xanthene-3-azo-dimethylaniline the same procedure is adopted as in Example 1, except that 24 parts of dimethylaniline are employed instead of the 21 parts of m-toluidine.

Example 3

To dye 100 lbs. of cellulose acetate yarn a reddish blue shade:—

The yarn is dyed with 1 lb. of its own weight of rhodamine 3 G extra (Colour Index No. 753) according to known technique. It is then entered into a bath at 15:1 ratio containing 5 lbs. of sodium nitrite and 15 lbs. of hydrochloric acid at 28° Tw. When diazotization is complete the yarn is rinsed and entered into a bath at 15:1 containing 2 lbs. phenol in solution as its sodium salt. Coupling proceeds rapidly at ordinary temperature, and is complete in 1 hour. The yarn is then washed, dried or otherwise treated as desired.

Example 4

To dye 100 lbs. of cellulose acetate yarn in hank form a reddish-blue shade:—

1 lb. of the dyestuff prepared according to Example 1 is dissolved in the form of its hydrochloride in 10 gallons of hot water. The solution obtained is added to a dyebath containing 300 gallons of water. The yarn is entered and dyed for ¾ hour the temperature rising to 75° C. being maintained at this temperature for a further ¾ hour. The yarn is now lifted, washed, and otherwise treated as desired.

Example 5

To dye 100 lbs. of cellulose acetate knitted fabric a greenish blue shade:—

1 lb. of the dyestuff obtained in Example 2 is dispersed by known methods in hot water and added to a dyebath containing 300 gallons of water. Dyeing is carried on as in Example 4 or until the desired shade is achieved when the goods are washed, dried, or otherwise treated and finished as requisite.

What I claim and desire to secure by Letters Patent is:—

1. Process for the coloration of materials containing organic derivatives of cellulose, comprising applying thereto a monoazo dyestuff having the general formula

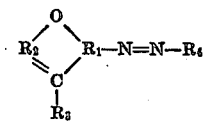

where $R_1$ and $R_2$ represent benzenoid residues, $R_3$ hydrogen, alkyl or aryl, and $R_4$ an azo coupling component.

2. Process for the coloration of materials containing cellulose acetate, comprising applying thereto a monoazo dyestuff having the general formula

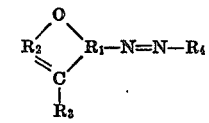

where $R_1$ and $R_2$ represent benzenoid residues, $R_3$ hydrogen, alkyl or aryl, and $R_4$ an azo coupling component.

3. Process for the coloration of materials containing cellulose acetate, comprising applying thereto an azo dyestuff obtained by diazotizing 2-methyl-3-amino-6-dimethyl-amino-9-ortho-ethylcarboxy-phenyl-xantheneyl chloride and coupling with azo components.

4. Process for the coloration of materials containing cellulose acetate, comprising applying thereto an azo dyestuff obtained by diazotizing 2-methyl-3-amino-6-dimethyl-amino-9-ortho-ethylcarboxy-phenyl-xantheneyl chloride and coupling with azo components of the benzene series.

5. Materials comprising organic derivatives of cellulose colored with monoazo dyestuffs having the general formula

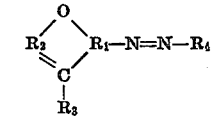

where $R_1$ and $R_2$ represent benzenoid residues, $R_3$ hydrogen, alkyl or aryl, and $R_4$ an azo coupling component.

6. Materials comprising cellulose acetate colored with monoazo dyestuffs having the general formula

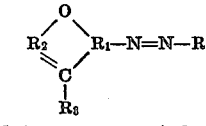

where $R_1$ and $R_2$ represent benzenoid residue, $R_3$ hydrogen, alkyl or aryl, and $R_4$ an azo coupling component.

7. Materials comprising cellulose acetate colored with azo dyestuffs produced by diazotizing 2-methyl-3-amino-6-dimethylamine-9-ortho-ethylcarboxy-phenyl-xanthenyl chloride and coupling with azo components.

8. Materials comprising cellulose acetate colored with azo dyestuffs produced by diazotizing 2-methyl-3-amino-6-dimethylamino-9-ortho-ethylcarboxy-phenyl-xantheneyl chloride and coupling with azo components of the benzene series.

GEORGE HOLLAND ELLIS.